United States Patent
Harada et al.

(10) Patent No.: US 12,207,209 B2
(45) Date of Patent: Jan. 21, 2025

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP); Daisuke Kurita, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 409 days.

(21) Appl. No.: 17/595,366

(22) PCT Filed: May 14, 2020

(86) PCT No.: PCT/JP2020/019334
§ 371 (c)(1),
(2) Date: Nov. 15, 2021

(87) PCT Pub. No.: WO2020/230864
PCT Pub. Date: Nov. 19, 2020

(65) Prior Publication Data
US 2022/0210754 A1    Jun. 30, 2022

(30) Foreign Application Priority Data

May 16, 2019 (JP) .................................. 2019-093167

(51) Int. Cl.
*H04W 56/00* (2009.01)
*H04L 5/00* (2006.01)
*H04W 24/10* (2009.01)

(52) U.S. Cl.
CPC ......... *H04W 56/001* (2013.01); *H04L 5/0051* (2013.01); *H04W 24/10* (2013.01)

(58) Field of Classification Search
CPC ............... H04W 56/001; H04W 24/10; H04W 56/0015; H04L 5/0051
See application file for complete search history.

(56) References Cited

U.S. PATENT DOCUMENTS

2018/0279241 A1   9/2018  Lee et al.
2018/0368088 A1   12/2018 Nagaraja et al.
(Continued)

FOREIGN PATENT DOCUMENTS

CA        3070072 A1 *  1/2019  .......... H04J 11/0069
WO     20180174058 A1    9/2018
(Continued)

OTHER PUBLICATIONS

LG Electronics; "Initial Access and Mobility for NR-U", 3GPP TSG RAN WG1 #97, R1-1906676, Reno, USA; May 13-17, (23 Pages) (Year: 2019).*
(Continued)

*Primary Examiner* — Chi H Pham
*Assistant Examiner* — Samuel Dilan Rutnam
(74) *Attorney, Agent, or Firm* — Osha Bergman Watanabe & Burton LLP

(57) ABSTRACT

SSB indices are appropriately reported. A user terminal according to an aspect of the present disclosure includes a control section that determines an assumption utilized for a number of synchronization signal blocks (SSBs) actually transmitted in a given carrier, based on whether the given carrier is assumable to perform inter-cell synchronization, and a transmitting section that transmits information related to indices of SSBs detected.

5 Claims, 9 Drawing Sheets

(56) References Cited

U.S. PATENT DOCUMENTS

2020/0077312 A1    3/2020  Tsuboi et al.
2020/0245274 A1    7/2020  Huang et al.

FOREIGN PATENT DOCUMENTS

WO    2018/201842 A1    11/2018
WO    2018/231893 A1    12/2018

OTHER PUBLICATIONS

Nokia, Nokia Shanghai Bell: "Initial Access Signals and Channels for NR-U", 3GPP TSG RAN WG1 Meeting #96, R1-1902435, Athens Greece, Feb. 25-Mar. 1 (30 Pages) (Year: 2019).*

Extended European Search Report issued in counterpart European Patent Application No. 20805188.8, mailed on Jan. 2, 2023 (11 pages).

LG Electronics; "Initial access and mobility for NR-U"; 3GPP TSG RAN WG1 #97, R1-1906676; Reno, USA; May 13-17, 2019 (23 pages).

Ericsson; "Enhancements to initial access procedure"; 3GPP TSG-RAN WG1 Meeting #96b, R1-1904336; Xi'an, China; Apr. 8-12, 2019 (15 pages).

Office Action issued in the counterpart Japanese Application No. 2021-519487, mailed Aug. 15, 2023 (8 pages).

Office Action issued in the counterpart Japanese Application No. 2021-519487, mailed Apr. 11, 2023 (8 pages).

Nokia, Nokia Shanghai Bell: "Initial Access Signals and Channels for NR-U"; 3GPP TSG RAN WG1 Meeting #96, R1-1902435, Athens, Greece, Feb. 25-Mar. 1, 2019 (25 pages).

Potevio: "Discussion on Initial Access Procedure for NR-U"; 3GPP TSG RAN WG1 #97, R1-1907365, Reno, USA, May 13-17, 2019 (5 pages).

International Search Report issued in PCT/JP2020/019334 on Jun. 30, 2020 (1 page).

Written Opinion of the International Searching Authority issued in PCT/JP2020/019334 on Jun. 30, 2020 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

For existing LTE systems (for example, Rel. 8 to Rel. 12), specifications have been drafted on the assumption that exclusive operations are performed in frequency bands (also referred to as licensed bands, licensed carriers, licensed component carriers (licensed CCs), and so on) licensed for communication providers (operators). As the licensed CCs, for example, 800 MHz, 1.7 MHz, 2 GHz, and the like are used.

For existing LTE systems (for example, Rel. 13), usage of frequency bands (also referred to as unlicensed bands, unlicensed carriers, and unlicensed CCs) different from the above-described licensed bands is supported in order to extend frequency bands. The unlicensed bands are assumed as, for example, a 2.4-GHz band, a 5-GHz band, and the like in which Wi-Fi (registered trademark), Bluetooth (registered trademark) can be used.

In Rel. 13, carrier aggregation (CA) is supported in which the carrier (CC) of the licensed band is integrated with the carrier (CC) of the unlicensed band. In this manner, communication using the unlicensed band along with the licensed band is referred to as License-Assisted Access (LAA).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, the usage of the unlicensed band has been studied. Before transmission of data in the unlicensed band, listening (which is also referred to as Listen Before Talk (LBT), and the like) is performed.

In NR, Synchronization Signal (SS)/Physical Broadcast Channel (PBCH) blocks (SS blocks (SSBs)) are utilized. Studies have been conducted about derivation of frame timings for the unlicensed band based on SSBs.

There has been a demand for a method enabling reduction of PBCH decoding for peripheral cells of a UE while maintaining flexibility on the number of SSBs transmitted in an NR-U carrier. However, such a method has not been proposed yet. Lack of specification of the method may reduce communication throughput.

Thus, an object of the present disclosure is to provide a user terminal and a radio communication method that can appropriately report SSB indices.

Solution to Problem

A user terminal according to an aspect of the present disclosure includes a control section that determines an assumption utilized for a number of synchronization signal blocks (SSBs) actually transmitted in a given carrier, based on whether the given carrier is assumable to perform inter-cell synchronization, and a transmitting section that transmits information related to indices of SSBs detected.

Advantageous Effects of Invention

According to an aspect of the present disclosure, SSB indices can be appropriately reported.

DESCRIPTION OF EMBODIMENTS

<Unlicensed Band>

Figure 1:
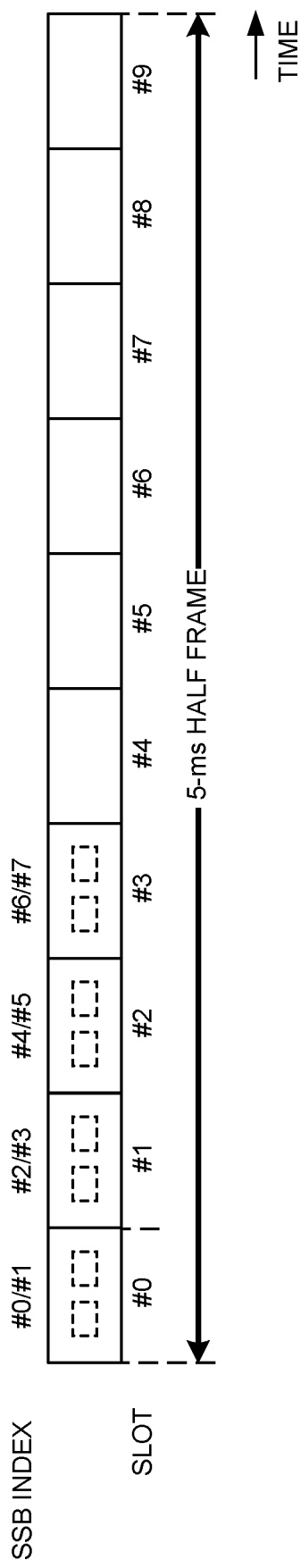
FIG. 1 is a diagram to show an example of SSB transmission candidate positions.

In an unlicensed band (for example, a 2.4-GHz band, a 5-GHz band, or a 6-GHz band), for example, it is assumed that a plurality of systems coexist, for example, a Wi-Fi system, a system supporting LAA (LAA system), and the like, and thus avoidance of transmission collisions and/or interference control between the plurality of systems may be needed.

In LAA in the existing LTE system (for example, Rel. 13), before transmitting data in the unlicensed band, a data transmission apparatus performs listening (also referred to as Listen Before Talk (LBT), Clear Channel Assessment (CCA), carrier sense, channel sensing, channel access operation, or the like) for checking whether any other apparatus (for example, a base station, a user terminal, a Wi-Fi apparatus, or the like) is performing transmission.

The transmission apparatus may be, for example, a base station (for example, a gNodeB (gNB)) in a downlink (DL) and a user terminal (for example, User Equipment (UE)) in an uplink (UL). A reception apparatus receiving data from the transmission apparatus may be, for example, a UE in the DL and a base station in the UL.

In LAA in the existing LTE system, the transmission apparatus initiates data transmission a given period (for example, immediately after the detection or during backoff) after detection of lack of transmission from any other apparatus (idle state) in LBT.

The NR system using the unlicensed band may be referred to as a NR-Unlicensed (U) system, an NR LAA system, and so on. NR-U may include the dual connectivity (DC) of the licensed band and the unlicensed band, a stand-alone (SA) licensed band, and so on.

Due to coexist with other systems or operators, a node (for example, a base station or a UE) in NR-U initiates transmission after confirming, by LBT, that the channel is idle.

In the NR-U system, in a case where an LBT result indicates an idle state (LBT-idle), the base station or the UE acquires a transmission opportunity (TxOP) to perform transmission. The base station or the UE performs no transmission in a case where the LBT result indicates a busy state (LBT-busy). The time for the transmission opportunity is also referred to as a Channel Occupancy Time (COT).

Note that LBT-idle may be interpreted as LBT success. LBT-busy may be interpreted as LBT failure.

<SSB>

In NR, synchronization signal/broadcast channel (Synchronization Signal/Physical Broadcast Channel (SS/PBCH)) blocks are utilized. The SS/PBCH blocks may be signal blocks including a primary synchronization signal (PSS), a secondary synchronization signal (SSS), and a broadcast channel (Physical Broadcast Channel (PBCH)) (and a demodulation reference signal (DMRS) for the PBCH. The SS/PBCH blocks may be referred to as synchronization signal blocks (SSBs).

A transmission unit for the SSBs may also be referred to as an SSB transmission period, an SSB set, an SS burst, an SS burst set, an SSB burst, and so on, or may simply be referred to as a burst. The SS burst may mean a set of SSBs included per given period (for example, a half frame (0.5 radio frame=5 ms). SSB indices may indicate the positions of SSBs per given period (for example, a half frame).

Within Frequency Range 1 (FR1), the SSB index may be represented by a number constituted of up to three bits and may be acquired from a sequence of PBCH DMRSs by the UE. Within Frequency Range 2 (FR2), the SSB index may be represented by a number constituted of a total of six bits including lower three bits from a sequence of PBCH DMRSs and upper three bits from a PBCH payload. Based on these bits, the SSB index may be acquired by the UE.

FIG. 1 is a diagram to show an example of SSB transmission candidate positions. The present example is an example of FR1, and it is assumed that the serving cell (or the SSB) has a sub carrier spacing (SCS) of 30 kHz and a slot length of 0.5 ms. For the subsequent drawings, a similar SCS (and slot length) is assumed. Note that the application of the present disclosure is not limited to the frequency ranges and SCS (and slot length) described above, and the like.

As shown in FIG. 1, for example, in FR1, eight SSB transmission candidate positions (shown by dashed lines) may be included in the half frame. The SSB transmission candidate positions may correspond to SSB indices #0 to #7 and may be implicitly notified to the UE by using different DMRS sequences. The UE can identify the SSB index, based on which of the eight patterns of DMRS sequences has been detected.

Note that in the present disclosure, the SSB corresponding to the SSB index is also simply referred to as the SSB index. Note that a beam corresponding to a beam index is also simply referred to as a beam index.

In this regard, the PBCH payloads in the identical half frame perfectly match. Specifically, the PBCH payloads included in an SSB with a first SSB index in a given half frame is identical to the PBCH payloads included in an SSB with a second SSB index in the identical half frame. According to this structure, the UE having successfully detected a plurality of SSBs can easily perform soft combining on the PBCH, allowing reception quality of the PBCH to be improved.

Master information blocks (MIB) during the PBCH transmission period (PBCH Transmission Time Interval (PBCH TTI)) (=80 ms) perfectly match.

On the other hand, in Rel-15 NR, PBCH payloads in other than MIBs are each constituted with eight bits and includes the following information for FR1.

Lower four bits (four bits) of a system frame number (SFN),
Half frame bit (one bit),
Upper one bit (one bit) of ssb-SubcarrierOffset ($k_{SSB}$)
Reserved (two bits).

In this regard, ssb-SubcarrierOffset corresponds to a value $k_{SSB}$ corresponding to a frequency domain offset between the SSB and the whole resource block grid which offset is indicated by the number of subcarriers. For ssb-SubcarrierOffset, four bits are notified in the MIB, and thus with an upper one bit of $k_{SSB}$ that is included in the PBCH payload taken into account, $k_{SSB}$ may be expressed in five bits. In the present disclosure, ssb-SubcarrierOffset and $k_{SSB}$ may be interchangeably interpreted.

Note that for FR2, a total of three bits including the upper one bit of $k_{SSB}$ described above and Reserved may indicate upper three bits of the SSB index.

Figure 2:
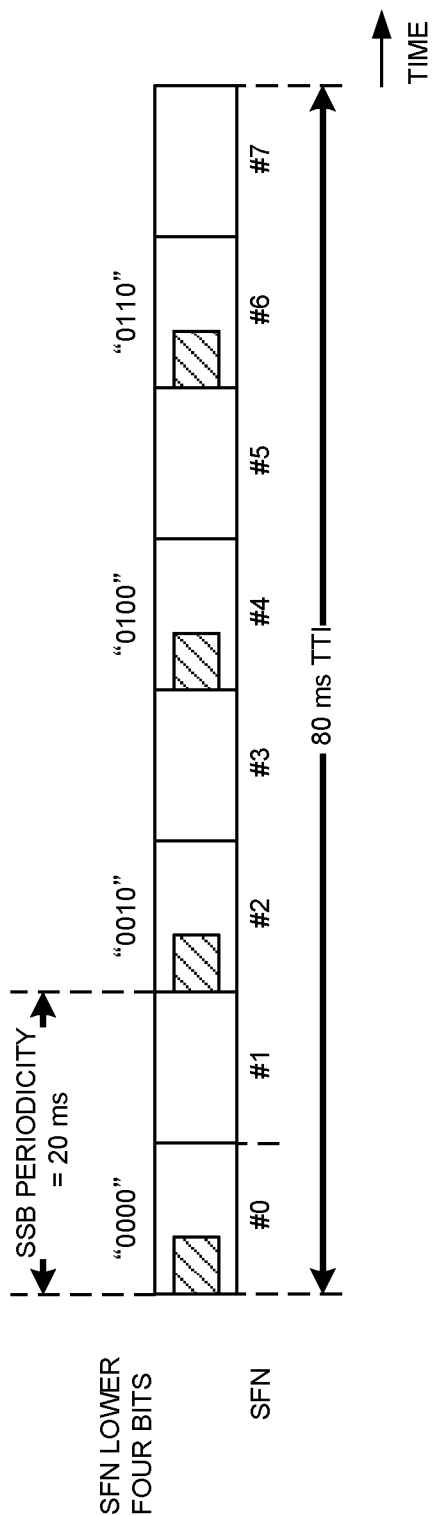
FIG. 2 is a diagram to show an example of a PBCH payload in a PBCH TTI.

Lower four bits of the SFN vary with frame even within the PBCH TTI. FIG. 2 is a diagram to show an example of the PBCH payload in the PBCH TTI. In the present example, SSBs are transmitted within eight radio frames (SFN #0 to #7) corresponding to the PBCH TTI (80 ms) with periodicity of 20 ms starting with SFN #0.

The lower four bits of the SFN are "0000" in SFN #0, "0010" in SFN #2, "0100" in SFN #4, and "0110" in SFN #6. Thus, in the SSBs with periodicity of 20 ms, only the second and third bits of the lower four bits of the SFN vary, with the first and fourth bits fixed.

With SSB periodicity of 5 ms or less, half frame bits vary with the position of the half frame within the radio frame (first or second position). With SSB periodicity of more than 5 ms, the half frame bits match between different SSB bursts in the PBCH TTI.

The upper one bit of $k_{SSB}$ and Reserved match between different SSB bursts.

The UE may be configured with a higher layer parameter (which may also be referred to as, for example, a Radio Resource Control (RRC) parameter "ssb-PositionsInBurst") related to the SSB burst. The upper layer parameter may also be referred to as information (parameter) related to the time domain position of the transmitted SSB within the burst. In the present disclosure, description is given under the assumption that the upper layer parameter is ssb-PositionsInBurst, but the name is not limited to this name.

The UE may assume that SSBs corresponding to an identical SSB index in an identical cell are quasi-co-located. The UE need not assume that SSBs corresponding to different SSB indices in an identical cell are quasi-co-located.

Note that QCL may be an indicator indicating statistical properties of at least one of a signal and a channel (expressed as the signal/channel). For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

A case that the UE assumes that a given control resource set (CORESET), channel, or reference signal is in a relationship of specific QCL (for example, QCL type D) with another CORESET, channel, or reference signal may be referred to as QCL assumption.

<SSB of NR-U>

For NR-U, the usage of a discovery reference signal (DRS, NR-U DRS, or the like) has been studied. The DRS may be a temporally continuous signal and may include one or more SSB sets and a CORESET and a Physical Downlink Shared Channel (PDSCH) associated with the one or more SSBs. The DRS may include a Channel State Information (CSI)-Reference Signal (RS). The DRS may be referred to as a discovery reference signal, a discovery signal (DS), and so on.

The CORESET associated with the SSB (Physical Downlink Control Channel (PDCCH)) may also be referred to as a Remaining Minimum System Information (RMSI)-CORESET, CORESET #0, and so on. The RMSI may be referred to as SIB1. The PDSCH associated with the SSB may be a PDSCH carrying the RMSI (RMSI PDSCH), or a PDSCH scheduled by using the PDCCH in the RMSI-CORESET (DCI including Cyclic Redundancy Check (CRC) scrambled with a System Information (SI)-Radio Network Temporary Identifier (RNTI)).

The SSBs including different SSB indices may be transmitted by using different beams (base station transmit beams). The SSB and the RMSI PDCCH and RMSI PDSCH corresponding to the SSB may be transmitted using an identical beam.

One DRS may be referred to as a DRS unit. A DRS unit size (time length) may be, for example, a half slot, one slot, or the like.

In connection with NR-U, studies have been conducted about extension of SSB transmission candidate positions with prevention of transmission of the DRS with the SSB taken into account, the prevention being caused by a failure in LBT. For example, studies have been conducted about extension of SSB transmission candidate positions during a period when the DRS may be transmitted (DRS transmission window) such that SSBs (beams) prevented from being transmitted due to a failure in LBT are transmitted by using other transmission candidate positions within the window.

Note that the length of the DRS transmission window may be configured for the UE by higher layer signaling or may be defined by specifications. The DRS transmission window may be referred to as a DRS transmission period, a DRS transmission window period, a DRS window, and so on.

In the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit y(PDU), or the like. The broadcast information may be, for example, a master information block (MIB), a system information block (SIB), minimum system information (Remaining Minimum System Information (RMSI)), other system information (OSI), or the like.

In the present disclosure, the SSB transmission candidate position may represent the position of the first symbol of the SSB candidate. The SSB transmission candidate position may be interpreted as a DRS transmission candidate position, a DRS unit, and so on.

Figure 3:
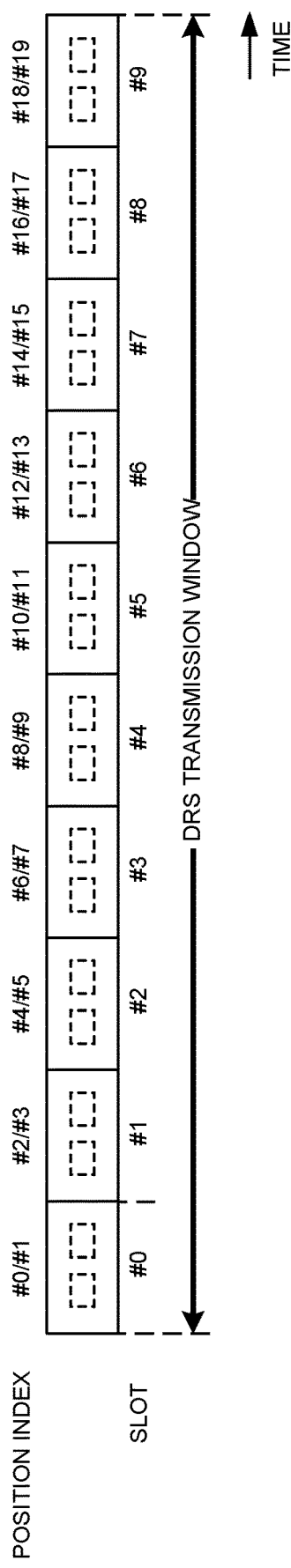
FIG. 3 is a diagram to show an example of extension of the SSB transmission candidate positions.

FIG. 3 is a diagram to show an example of extension of the SSB transmission candidate positions. In the present example, the DRS transmission window is assumed to have a length of 5 ms. For the subsequent drawings, a similar DRS transmission window length is assumed. Note that the application of the present disclosure is not limited to this DRS transmission window length.

In FIG. 3, one SSB candidate position is included in each half slot, and 20 SSB transmission candidate positions (candidate position indices=#0-#19) are shown in the DRS transmission window (half frame).

Note that the beam index may correspond to a set of SSB indices that can be assumed to be quasi-co-located within the DRS transmission window. Thus, the beam index may be interpreted as an effective SSB index. For example, in a case where the base station uses four SSB beams, the UE may assume that SSBs with candidate position indices #4i to #4i+3 (i is an integer of 0 or larger) are quasi-co-located with SSBs with effective SSB indices #0 to #3.

As shown in FIG. 3, indices simply indicating the SSB candidate positions within the DRS transmission window may be referred to as SSB position indices, location indices, candidate position indices, and so on.

For NR in Rel-16 and later versions, studies have been conducted about a UE determining which of the candidate positions within the DRS transmission window the SSB has been detected at, based on the combination of the DMRS sequence of the PBCH and given bits of the PBCH payload.

For example, studies have been conducted about the UE identifying candidate positions corresponding to SSBs detected, based on PBCH DMRS sequence indices (three bits (eight patterns)) of the SSBs detected and given bits of the PBCH payload (1 bit (case of SCS=15 kHz) or two bits (case of SCS=30 kHz)). The given bits of the PBCH payload may correspond to bits included in the three bits available as the most significant bits (MSBs) of the SSB index in FR2 in Rel-15 NR.

In a case of being required for PBCH decoding of a neighbour cell (for example, in a case where cells are asynchronous), the UE may be provided with a time permitted for acquisition of SSB indices, for example, by a higher layer parameter or the like.

Figure 4:
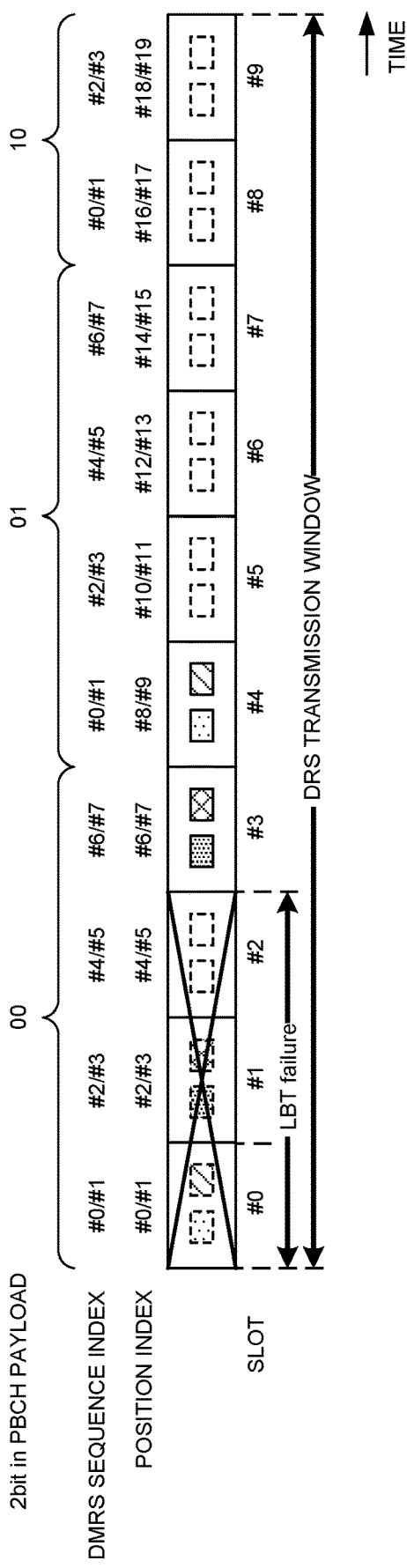
FIG. 4 is a diagram to show a particular example of the SSB candidate positions.

FIG. 4 is a diagram to show a particular example of the SSB candidate positions. In the present example, slots #0 to #2 are not transmitted due to failure in LBT. DMRS sequence indices #0 to #3 corresponding to position indices #0 to #3 supposed to be transmitted in slots #0 and #1 may be transmitted in slots #3 and #4 (position indices #6 to #9) within the identical DRS transmission window.

In FIG. 4, SSBs with identical hatching may indicate that an identical beam is applied (or an identical QCL is assumed). SSBs with different hatching may indicate that different beams are applied (or different QCLs are assumed).

In FIG. 4, in response to detection of an SSB, the UE acquires an effective index, based on the DMRS sequence of the SSB. The UE may assume that the effective SSB index is identical to the DMRS sequence index.

In the example in FIG. 4, the given bits of the PBCH payload described above may indicate a group index.

The group index may correspond to information for deriving a half frame timing for the cell, and may indicate the candidate position corresponding to the wraparound order. In this regard, the unit of wraparound may correspond to information on how many every SSB candidate positions (position indices) an identical DMRS sequence index repeats.

The group index may also be referred to as, for example, information related to the position index of the detected SSB within the DRS transmission window, information for identifying the order of the SSB for the identical DMRS sequence index within the DRS transmission window, information for identifying the position index from the DMRS sequence index, timing related information, timing information, and so on.

Note that the unit of wraparounds may be referred to as, for example, the maximum number of DMRS sequence indices within the DRS transmission window, the periodicity of DMRS sequence indices within the DRS transmission window, and so on. Note that the wraparounds may mean that the index such as the DMRS sequence index returns to zero after reaching the maximum value. The unit of wraparounds is desirably identical within one DRS transmission window.

FIG. 4 shows an example in which the unit of wraparounds is eight and in which the group index (given bits of the PBCH payload) includes 0, 1, and 2 ("00," "01," and "10").

The group index indicates the order of the candidate position within the DRS transmission window in connection with the identical DMRS sequence index. For example, in FIG. 4, the position index corresponding to the group index=i (i=0 to 2) may correspond to #4i, #4i+1, ..., #4i+7 (up to #19).

Based on the group index acquired by decoding the PBCH, the UE may identify (determine) half frame timings for the detected cell and a peripheral cell with the identical frequency. Note that in the present disclosure, the half frame timing may be interpreted as at least one of a frame timing, a slot timing, and so on.

<Problem with Determination of SSB Candidate Positions for NR-U>

In FR1 in Rel-15 NR, the SSB index (position index) =beam index equivalent, and the SSB index is expressed by the PBCH DMRS sequence index.

On the other hand, in response to being configured with a beam report during SSB-based measurement (for example, being configured with reportQuantityRS-Indexes, maxNrofRS-IndexesToReport, includeBeamMeasurements, and the like included in a report configuration information (RRC information element "reportConfigNR")), the UE may include the SSB index in the beam report.

For measurement of an inter-cell synchronous carrier (with an RRC parameter "deriveSSB-IndexFromCell" configured), the UE may identify the SSB index of the SSB detected/measured, based on the frame timing for the serving cell or one cell detected (without detection of the PBCH DMRS sequence, PBCH decoding, or the like).

Note that deriveSSB-IndexFromCell may be a parameter indicating whether the timing for the serving cell may be used to derive the index of the SS block transmitted by the neighbour cell, and may correspond to a higher layer parameter related to inter-cell synchronization.

For measurement of inter-cell asynchronous carrier (with the RRC parameter "deriveSSB-IndexFromCell" not configured), the UE may identify the SSB index of the SSB detected/measured, by detecting the PBCH DMRS sequence in the cell detected.

Incidentally, there is an agreement in the standards that in contrast to the SSB position indices 0 to 19 in NR-U, the maximum number of SSBs that can be transmitted within the DRS transmission window (5-ms window) is 8. Thus, the number of beams is 8 at a maximum, and the SSB position index itself need not be included in the beam report. However, a part of the SSB position index is desirably reported as a beam index equivalent. In this case, a possible need for PBCH decoding leads to problems such as measurement load in a UE and delay.

Thus, a proposal has been made that the number of SSBs transmitted which is expected by the UE be limited to 1, 2, 4, or 8 such that the PBCH DMRS sequence index=beam index equivalent even in the inter-cell asynchronous environment. Even in a case of not knowing the number of SSBs actually transmitted, the UE may report the DMRS sequence index.

The base station can determine which beam has been detected by the UE, in accordance with the following assumptions:

For the number of SSBs transmitted=8, DMRS sequence indices #0 to #7 correspond to different beams.

For the number of SSBs transmitted=4, DMRS sequence indices #0/#4, #1/#5, #2/#6, and #3/#7 correspond to different beams (in other words, for example, the DMRS sequence indices #0 and #4 are assumed to correspond to an identical beam).

For the number of SSBs transmitted=2, DMRS sequence indices #0/#2/#4/#6 and #1/#3/#5/#7 correspond to different beams.

For the number of SSBs transmitted=1, the beam does not vary with DMRS sequence index (all of the DMRS sequence indices correspond to an identical beam).

As described above, by limiting the candidates for the number of SSBs transmitted to numbers by which a maximum number of beams of 8 is exactly divisible, i.e., 1, 2, 4, and 8, the relationship between the DMRS sequence index and the beam index may be uniquely identified.

However, limiting the number of SSBs actually transmitted to 1, 2, 4, and 8 is not preferable in terms of flexibility of cell deployment, scheduling and the like.

On the other hand, in a case where the number of SSBs actually transmitted is assumed to possibly take any value ranging from 1 to 8, then in some cases, an identical DMRS sequence index corresponds to different beams when the above-described group index indicated in the PBCH payload varies.

Figure 5:
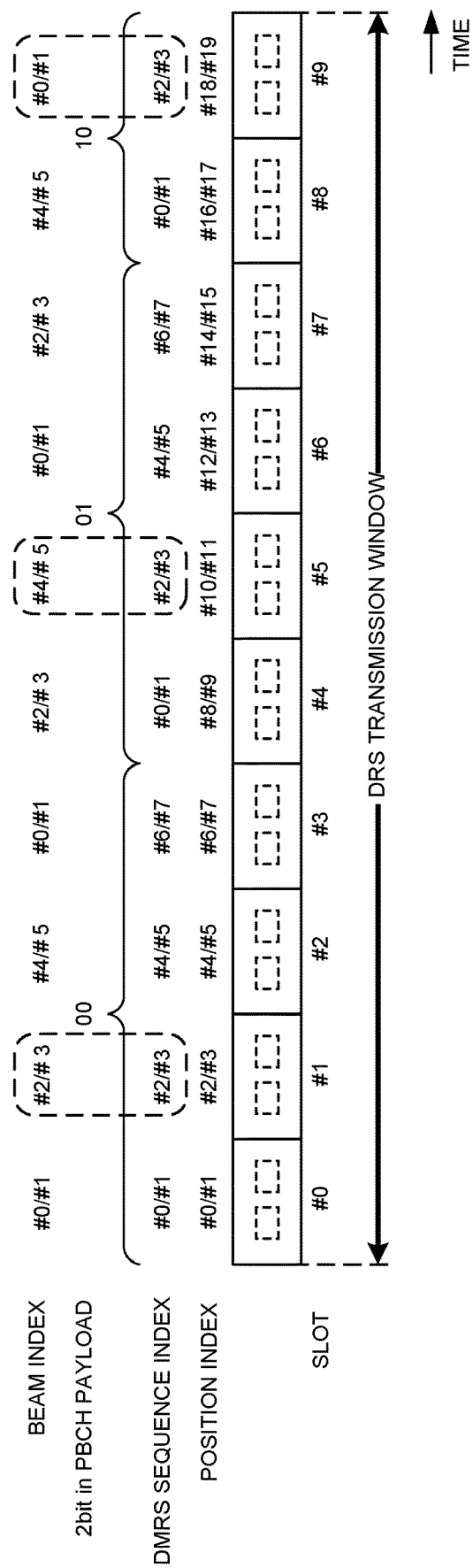
FIG. 5 is a diagram to show an example in which DMRS sequence indices are identical and beam indices are different from each other.

FIG. 5 is a diagram to show an example in which DMRS sequence indices are identical and beam indices are different from each other. The position index, the DMRS sequence index, and the group index are as shown in FIG. 4.

In the present example, the number of SSBs actually transmitted is 6 (corresponding to beam indices #0 to #5). In this case, as illustrated, there is a difference between the DMRS sequence index and the beam index. For example, even in a case of identical DMRS sequence index #2, beam indices may correspond to #2, #4, and #0. In this case, the UE fails to identify the beam unless the UE performs PBCH decoding to acquire group indices.

As described above, there has been a demand for a method enabling reduction of PBCH decoding for the peripheral cells of the UE while maintaining flexibility on the number of SSBs transmitted in the NR-U carrier. However, no such a method has been proposed. Lack of specification of the method may reduce communication throughput.

Thus, the inventors of the present invention came up with a method for appropriately reporting SSB indices.

Embodiments according to the present disclosure will be described in detail with reference to the drawings as follows. The radio communication methods according to respective embodiments may each be employed individually, or may be employed in combination.

NR-U in the present disclosure is not limited to LAA, and may include a case where the unlicensed band is used in a stand-alone manner. Note that the NR-U carrier may be interpreted as a carrier in which LBT is utilized, an unlicensed carrier, an unlicensed band, a given carrier, and so on.

The number of SSBs actually transmitted may hereinafter be referred to as a parameter N. The UE and the network may assume that SSBs with an identical mod (position index, N) (mod represents a modulo operation) are quasi-co-located. Note that N may be referred to as a parameter used by the UE to derive QCL properties between the position indices.

In the present disclosure, the number of SSBs actually transmitted may be interchangeably interpreted as the number of SSBs for actual transmission, the number of SSBs assumed to be actually transmitted, and so on.

(Radio Communication Method)

First Embodiment

In a first embodiment, the UE may determine an assumption utilized for the value of N, based on at least one of (1) to (4) described below.

(1) Whether inter-cell synchronization in a measurement target carrier can be assumed, (2) A notification related to constraints on the value of N in the measurement target carrier, (3) Whether in the measurement target carrier, a common value of N is configured for cells or the value of N is configured for some of the cells, or a common value of N is configured for the cells or the value of N is configured for some of the cells and the values of N include values other than 1, 2, 4, and 8.

(4) Whether in the measurement target carrier, the value of N has not been configured yet.

For example, based on at least one of (1) to (4) described above, the UE may switch between a first assumption that N may take any value (or any value within a given range, for example, the range from 1 to 8) and a second assumption that N is limited to particular values (for example, 1, 2, 4, and 8). Note that the second assumption may correspond to an assumption that N=8.

In connection with (1) described above, the UE may determine that the first assumption is followed in a case where the measurement target carrier is of an inter-cell synchronization (or the measurement target carrier can be assumed to be of inter-cell synchronization) and that the second assumption is followed in a case where the measurement target carrier is of inter-cell non-synchronization (or the measurement target carrier can be assumed to be of inter-cell non-synchronization).

Note that the UE may determine, based on, for example, deriveSSB-IndexFromCell, whether the measurement target carrier can be assumed to be of inter-cell synchronization.

In connection with (2) described above, the notification related to constraints on the value of N in the measurement target carrier may be explicit or implicit. For example, information indicating whether the measurement target carrier is subject to the constraints in the second assumption may be configured for the UE by the higher layer signaling. Such a notification may be included in MeasObjectNR, intraFreqCellReselectionInfo, or interFreqCellReselectionInfo.

In connection with (3) described above, the UE may determine that the second assumption is followed in a case where a common value of N is not configured for the cells or the value of N is configured for some of the cells in the measurement target carrier, and that otherwise, the first assumption is followed.

In connection with (4) described above, the UE may determine that the second assumption is followed before the value of N being configured (for example, at the time of initial access) in the measurement target carrier and that otherwise, the first assumption is followed.

According to the first embodiment described above, the number of SSBs actually transmitted can be appropriately assumed.

Second Embodiment

A second embodiment relates to reporting of the SSB index in a case where the assumption can be made that the N may exclusively take particular values (in other words, the second assumption described above).

In a case of being configured with the beam report and following the second assumption, the UE may report the PBCH DMRS sequence index as an SSB index (or a beam index equivalent).

Even in a case of following the second assumption, the UE may be notified of a common value of N for cells (for example, all the cells) in the measurement target carrier or values of N for some of the cells. Based on the values of N, the UE may execute processing on measured values (for example, averaging processing of measurement samples).

In view of the beam report, reporting the DMRS sequence index is sufficient, and thus which of 1, 2, 4, and 8 a concrete value of N is need not be known by the UE, but knowing the value of N allows SSBs with identical mod (DMRS index, N) to be assumed to be quasi-co-located. Thus, even the second assumption is followed, determining the accurate value of N is preferable. For quasi-co-located SSBs, the UE may execute averaging on the measurement samples.

The value of N may be included in MeasObjectNR, intraFreqCellReselectionInfo, or interFreqCellReselectionInfo for notification.

In a case of being configured with the beam report and with the value of N, the UE may report the value of mod (DMRS index, N) as an SSB index (or a beam index equivalent).

According to the second embodiment described above, even in a case where the assumption is made that N may exclusively take particular values, the SSB index can be appropriately reported.

Third Embodiment

A third embodiment relates to reporting of the SSB index in a case where the assumption can be made that that N may take any value (in other words, the first assumption described above).

In a case of being configured with the beam report and following the first assumption, the UE may assume an inter-cell synchronous environment. In a case of being configured with the beam report and following the first assumption, the UE may report the SSB position index as an SSB index.

In a case of following the first assumption, the UE may be notified of a common value of N for cells (for example, all the cells) in the measurement target carrier or values of N for some of the cells. Based on the values of N, the UE may execute processing on measured values (for example, averaging processing of the measurement samples).

In a case of being configured with the beam report and following the first assumption and being notified of (configured with) the value of N, the UE may report mod (index, N) as an SSB index (or a beam index equivalent). The "index" of mod (index, N) may be an SSB position index.

Note that one common value of N may be configured for a plurality of cells. The value of N may be included in MeasObjectNR, intraFreqCellReselectionInfo, or interFreqCellReselectionInfo for notification.

In a case of following the first assumption, the UE may determine whether the SSB position index or mod (index, N) is reported as an SSB index, based on specifications or an explicit indication (configuration), or may make implicit determination (for example, with N configured, mod (index, N) is reported, and otherwise, the SSB position index is reported).

The UE need not support (need not assume) a case where PBCH decoding is required (for example, a case of an inter-cell asynchronous carrier and N being allowed to take a value other than 1, 2, 4, and 8). The UE may support the case where PBCH decoding is required. However, in this case, a longer measurement delay may be permitted than in a case where PBCH decoding is not required.

The UE may report, as UE capability information, whether the case can be supported where PBCH decoding is required in a case where the first assumption is followed. In a case of not having this capability, the UE may assume not to support the case.

According to the third embodiment described above, even in a case where the assumption is made that N may take any value, the SSB index can be appropriately reported.

<Variations>

Note that contents of the first assumption and second assumption in the present disclosure may be interchangeably interpreted.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
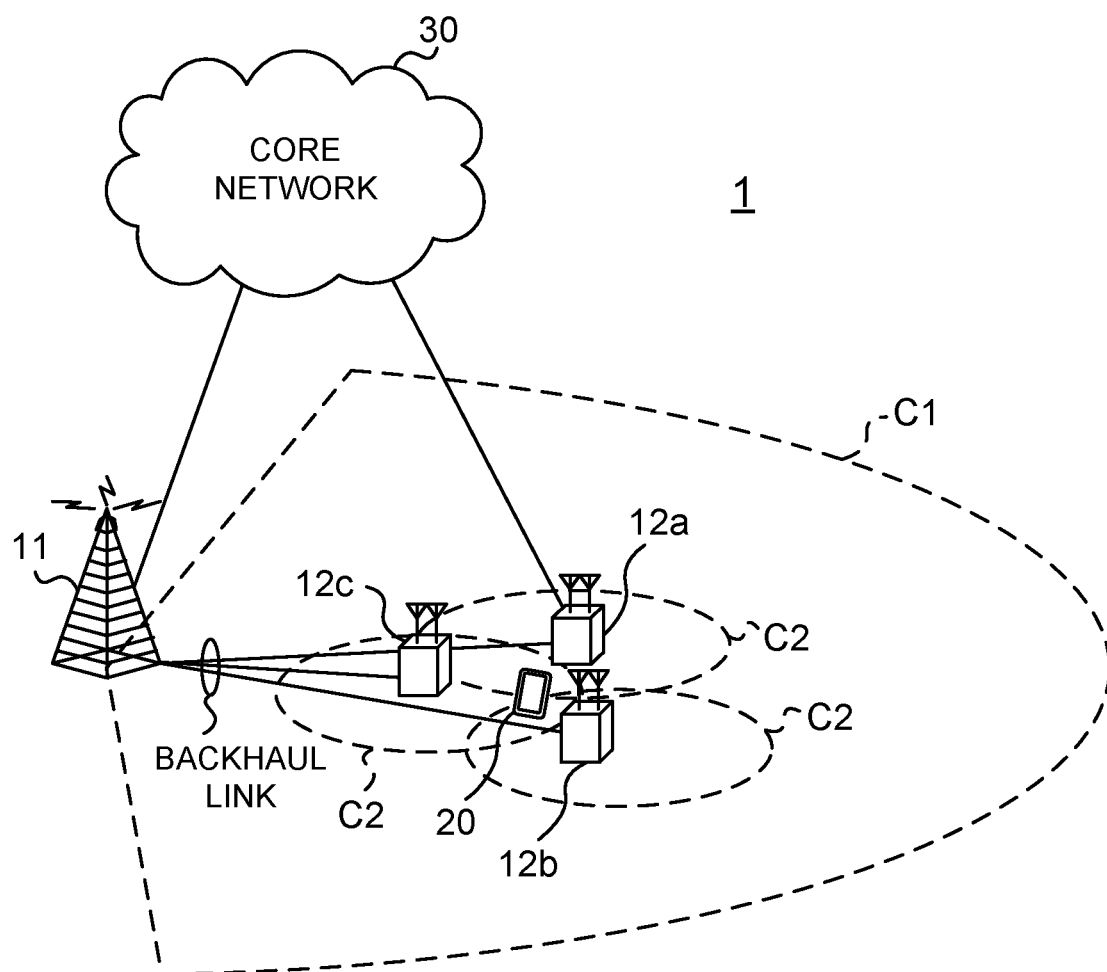
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
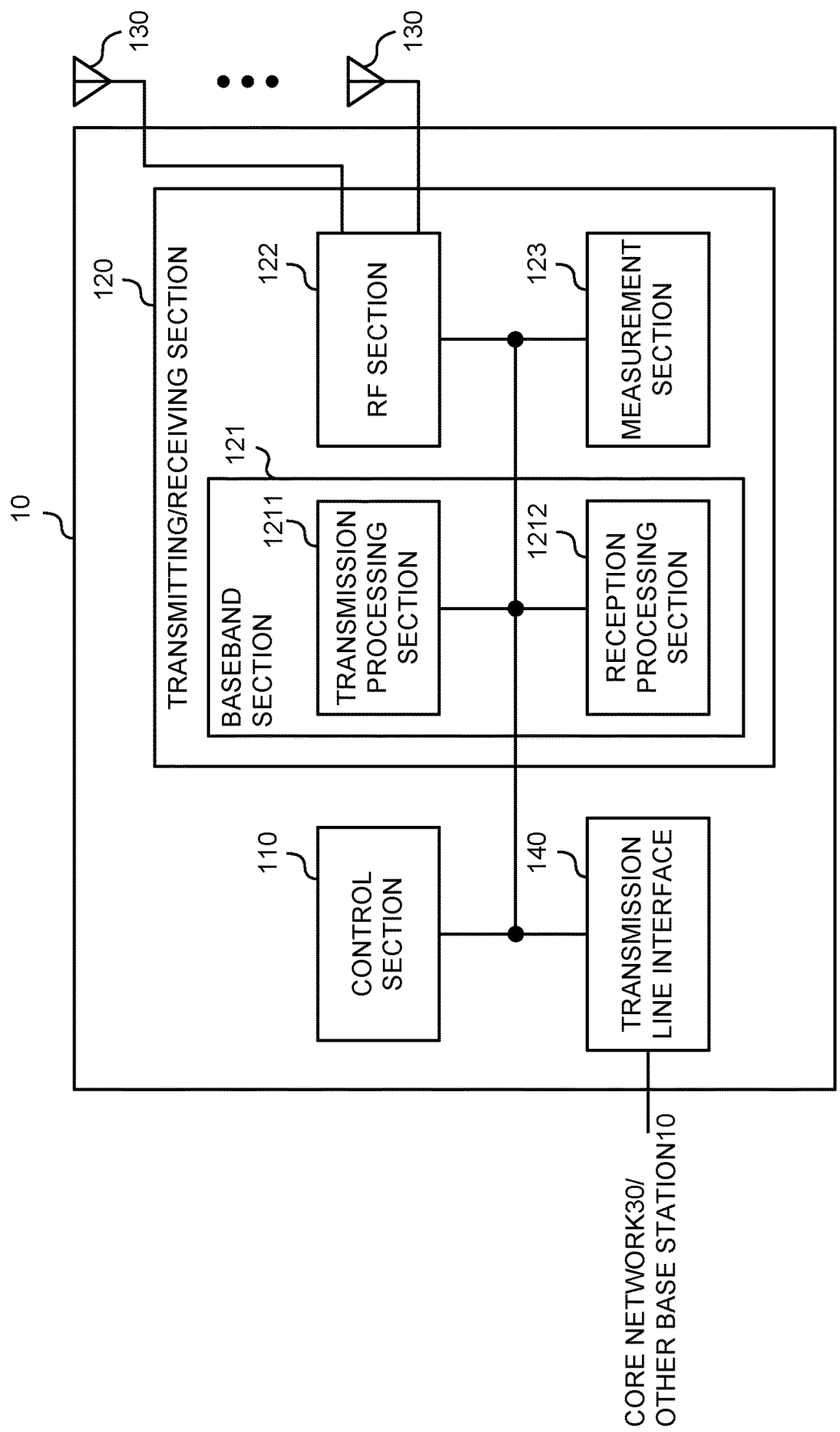
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit, to the user terminal 20, information (for example, a higher layer parameter "ssb-PositionInBurst") related to the positions of synchronization signal blocks (SSBs) in a synchronization signal (SS) burst.

The transmitting/receiving section 120 may transmit the SSB, the DRS, and so on. The transmitting/receiving section 120 may include information required to derive frame timings (for example, information of the group indices), in the PBCH payloads of the SSBs for transmission.

(User Terminal)

Figure 8:
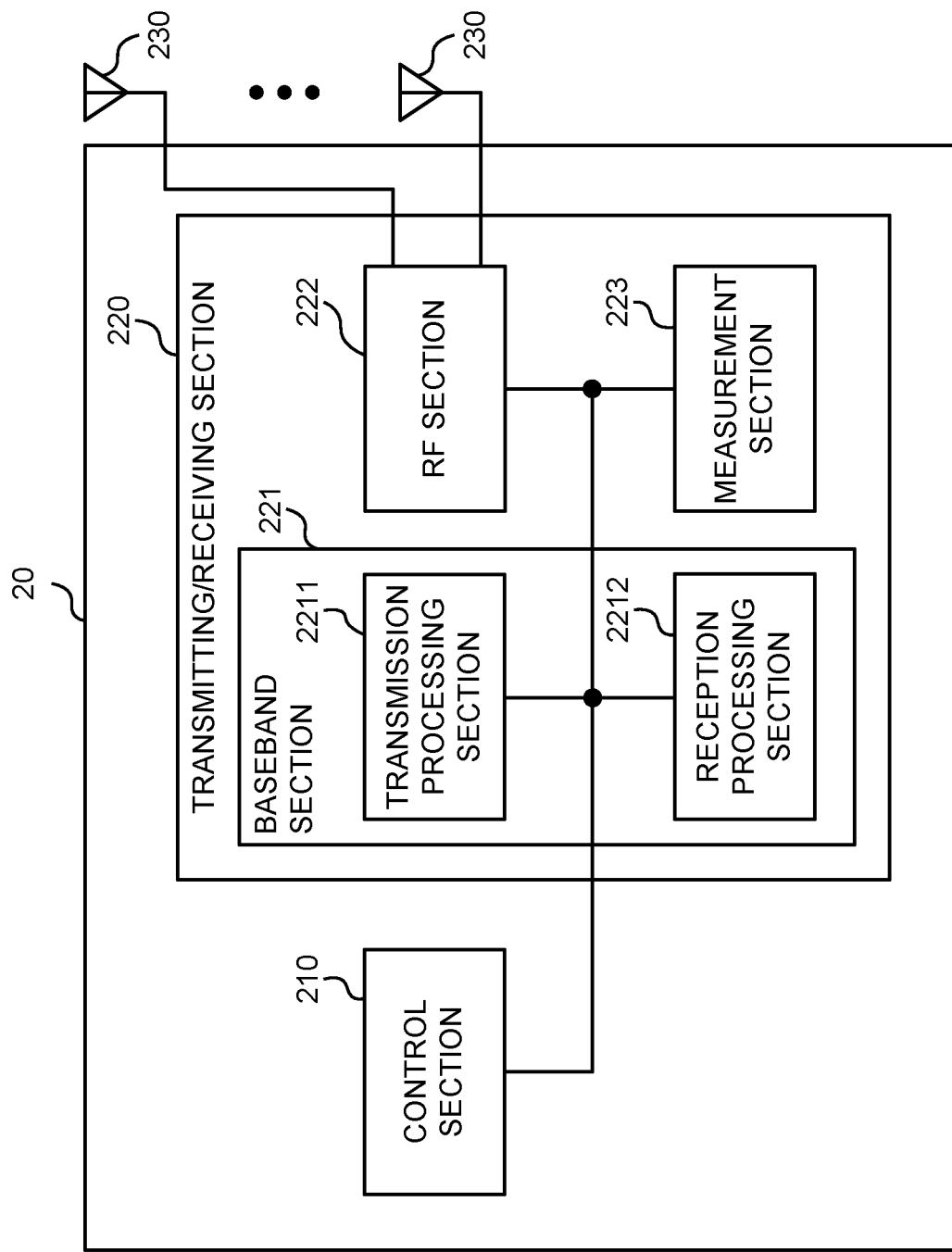
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive information (for example, the higher layer parameter "ssb-PositionInBurst") related to the positions of synchronization signal blocks (SSBs) in a synchronization signal (SS) burst. The information may be notified by using, for example, at least one of System Information Block 1 (SIB1) and RRC signaling.

Based on the information related to the positions of the SSBs in the SS burst, the control section 210 may determine the Quasi-Co-Location (QCL) assumption between the SSB indices within the transmission window for the discovery reference signal (DRS) in the carrier to which listening is applied (for example, an unlicensed carrier).

Note that the carrier to which listening is applied may be referred to as an LAA cell, an LAA secondary cell (LAA SCell), and so on. In the carrier to which the listening is applied, the user terminal 20 may perform listening before transmission. In this regard, the "listening" in the present disclosure may be interpreted as at least one of Listen Before Talk (LBT), Clear Channel Assessment (CCA), carrier sense, sensing, channel sensing, channel access operation, and so on.

The transmitting/receiving section 220 may receive (or detect) the SSB. The control section 210 may acquire the effective SSB index, based on the PBCH DMRS included in the SSB described above. Note that the SSB in the present disclosure may be interpreted as the SSB included in the DRS or may be interpreted as the DRS.

The control section 210 may determine whether the assumption (for example, the first assumption or the second assumption) utilized for the number of SSBs actually transmitted in a given carrier (the carrier to which listening is applied), based on whether the given carrier can be assumed to perform inter-cell synchronization.

The transmitting/receiving section 220 may transmit information related to detected SSB index.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
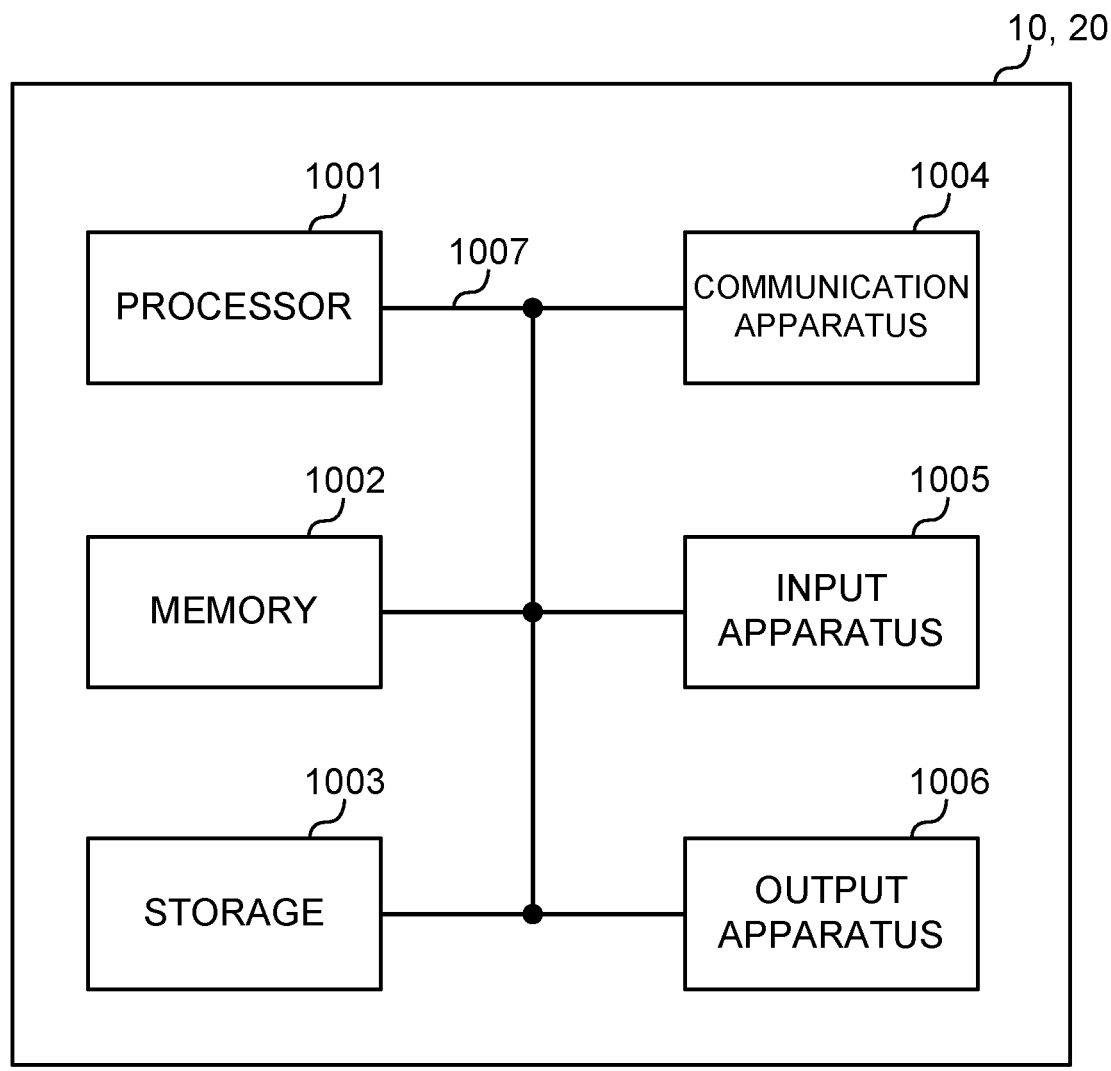
FIG. 9 is a diagram to show an example of a hardware structure of the radio base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the radio base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on JP 2019-093167 A filed on May 16, 2019. The entire contents of the application are incorporated herein.

What is claimed is:

1. A terminal comprising:
    a receiver that receives a physical broadcast channel (PBCH) included in a synchronization signal block (SSB) in a carrier to which sensing is applied and first information regarding a number of transmitted SSBs; and
    a processor that determines an index of the SSB, based on the first information and an index of a demodulation reference signal (DMRS) sequence of the PBCH,
    wherein the processor derives an index of an SSB of a neighbor cell without decoding a PBCH included in the SSB of the neighbor cell, based on whether RRC parameter deriveSSB-IndexFromCell, which is related to inter-cell synchronization, is configured,
    wherein the processor switches between a first assumption that a value indicated by the first information can take on any value and a second assumption that the value indicated by the first information is limited to 1, 2, 4 and 8, based on:
        second information, configured by higher layer signaling, related to constraints on the value indicated by the first information, and
        whether the value indicated by the first information, being a value for a part of cells to be measured or being a common value among all cells to be measured, includes a value other than 1, 2, 4 and 8, and
    wherein whether the value indicated by the first information is subject to the constraints on the second assumption is configured by the second information.

2. The terminal according to claim 1, wherein the processor assumes that SSBs with a same index as that of the SSB are quasi co-located (QCL).

3. A radio communication method for a terminal, comprising:
    receiving a physical broadcast channel (PBCH) included in a synchronization signal block (SSB) in a carrier to which sensing is applied and first information regarding a number of transmitted SSBs;
    determining an index of the SSB based on the first information and an index of a demodulation reference signal (DMRS) sequence of the PBCH;
    deriving an index of an SSB of a neighbor cell without decoding a PBCH included in the SSB of the neighbor cell, based on whether RRC parameter deriveSSB-IndexFromCell, which is related to inter-cell synchronization, is configured; and
    switching between a first assumption that a value indicated by the first information can take on any value and a second assumption that the value indicated by the first information is limited to 1, 2, 4 and 8, based on:
        second information, configured by higher layer signaling, related to constraints on the value indicated by the first information, and
        whether the value indicated by the first information, being a value for a part of cells to be measured or being a common value among all cells to be measured, includes a value other than 1, 2, 4 and 8,
    wherein whether the value indicated by the first information is subject to the constraints on the second assumption is configured by the second information.

4. A base station comprising:
    a transmitter that transmits a physical broadcast channel (PBCH) included in a synchronization signal block (SSB) in a carrier to which sensing is applied and first information regarding a number of transmitted SSBs; and
    a processor that determines an index of a demodulation reference signal (DMRS) sequence of the PBCH, based on the first information and an index of the SSB,
    wherein the processor configures RRC parameter deriveSSB-IndexFromCell, which is related to inter-cell synchronization, to a terminal to indicate whether an index of an SSB of a neighbor cell is derived without decoding a PBCH included in the SSB of the neighbor cell,
    the processor controls the terminal to switch between a first assumption that a value indicated by the first information can take on any value and a second assumption that the value indicated by the first information is limited to 1, 2, 4 and 8, based on:
        second information, configured by higher layer signaling, related to constraints on the value indicated by the first information, and
        whether the value indicated by the first information, being a value for a part of cells to be measured or being a common value among all cells to be measured, includes a value other than 1, 2, 4 and 8, and
    wherein whether the value indicated by the first information is subject to the constraints on the second assumption is configured by the second information.

5. A system comprising a terminal and a base station, wherein the terminal comprises:
    a receiver that receives a physical broadcast channel (PBCH) included in a synchronization signal block (SSB) in a carrier to which sensing is applied and first information regarding a number of transmitted SSBs; and
    a processor of the terminal that determines an index of the SSB based on the first information and an index of a demodulation reference signal (DMRS) sequence of the PBCH,
    wherein the processor of the terminal derives an index of an SSB of a neighbor cell without decoding a PBCH included in the SSB of the neighbor cell, based on whether RRC parameter deriveSSB-IndexFromCell, which is related to inter-cell synchronization, is configured,
    the processor of the terminal switches between a first assumption that a value indicated by the first information can take on any value and a second assumption that the value indicated by the first information is limited to 1, 2, 4and 8, based on:
        second information, configured by higher layer signaling, related to constraints on the value indicated by the first information, and
        whether the value indicated by the first information, being a value for a part of cells to be measured or being a common value among all cells to be measured, includes a value other than 1, 2, 4 and 8,
    wherein whether the value indicated by the first information is subject to the constraints on the second assumption is configured by the second information, and
    the base station comprises:
        a transmitter that transmits the PBCH and the first information; and
        a processor of the base station that determines the index of the DMRS sequence of the PBCH, based on the first information and the index of the SSB, wherein the processor of the base station configures the RRC parameter deriveSSB-IndexFromCell, which is related to inter-cell synchronization, to the terminal, and
controls the terminal to switch between the first assumption and the second assumption based on:
the second information, and
the value indicated by the first information.

* * * * *